US008850773B2

(12) United States Patent
Cohen

(10) Patent No.: US 8,850,773 B2
(45) Date of Patent: Oct. 7, 2014

(54) POOL LINER RETAINING SYSTEM

(75) Inventor: Joe Cohen, Anna, IL (US)

(73) Assignee: Jo-Co Pools Inc., Anna, IL (US)

(*) Notice: Subject to any disclaimer, the term of this patent is extended or adjusted under 35 U.S.C. 154(b) by 0 days.

(21) Appl. No.: 13/486,814

(22) Filed: Jun. 1, 2012

(65) Prior Publication Data

US 2012/0304582 A1    Dec. 6, 2012

Related U.S. Application Data

(60) Provisional application No. 61/492,166, filed on Jun. 1, 2011.

(51) Int. Cl.
| | | |
|---|---|---|
| *E04B 2/00* | (2006.01) | |
| *F16B 5/06* | (2006.01) | |
| *E04H 4/00* | (2006.01) | |
| *E04H 7/02* | (2006.01) | |
| *E04B 2/86* | (2006.01) | |
| *E04H 4/14* | (2006.01) | |
| *F16B 5/00* | (2006.01) | |

(52) U.S. Cl.
CPC ............ *E04H 4/0043* (2013.01); *F16B 5/0692* (2013.01); *E04H 2004/147* (2013.01); *E04H 7/02* (2013.01); *F16B 5/0012* (2013.01); *E04H 4/0081* (2013.01); *E04B 2/8664* (2013.01)
USPC ........................ 52/588.1; 52/742.12; 52/169.8

(58) Field of Classification Search
USPC .......... 52/169.7, 169.8, 588.1, 590.1, 742.12, 52/742.14
See application file for complete search history.

(56) References Cited

U.S. PATENT DOCUMENTS

| | | | |
|---|---|---|---|
| 3,468,088 A | | 9/1969 | Miller |
| 3,555,751 A | | 1/1971 | Thorgusen |
| 3,564,791 A | | 2/1971 | Arp |
| 3,673,751 A | | 7/1972 | Boassy et al. |
| 3,736,599 A | * | 6/1973 | Kessler et al. ............... 52/169.7 |
| 3,739,539 A | | 6/1973 | Posnick |
| 3,812,633 A | | 5/1974 | Shanni et al. |
| 3,971,075 A | | 7/1976 | Heinbaugh et al. |
| 3,974,605 A | | 8/1976 | Beatty et al. |
| 4,015,379 A | | 4/1977 | Colson, Jr. |
| 4,047,340 A | | 9/1977 | Witte et al. |
| 4,055,922 A | | 11/1977 | Ellington et al. |
| 4,090,337 A | | 5/1978 | Szekeres |
| RE29,936 E | | 3/1979 | Arp |
| 4,177,614 A | | 12/1979 | Arp |

(Continued)

FOREIGN PATENT DOCUMENTS

| | | |
|---|---|---|
| BE | 785 357 A1 | 10/1972 |
| BE | 785357 | 10/1972 |

(Continued)

OTHER PUBLICATIONS

European Search Report for European Application No. 12170308 dated Sep. 19, 2012.

(Continued)

*Primary Examiner* — Jeanette E Chapman
*Assistant Examiner* — Daniel Kenny
(74) *Attorney, Agent, or Firm* — Polsinelli PC

(57) ABSTRACT

A pool liner retaining system having a pool wall structure that includes a plurality of interlocking panels and methods of constructing a pool wall structure using such interlocking panels are disclosed.

21 Claims, 10 Drawing Sheets

(56) References Cited

U.S. PATENT DOCUMENTS

| | | | |
|---|---|---|---|
| 4,227,361 A | 10/1980 | Miller | |
| 4,263,759 A | 4/1981 | Miller | |
| 4,297,819 A | 11/1981 | Arp | |
| 4,364,211 A | 12/1982 | Arp et al. | |
| 4,432,173 A | 2/1984 | Kleinert | |
| 4,443,982 A | 4/1984 | Dalbanne | |
| 4,635,304 A | 1/1987 | Zikmanis et al. | |
| 4,976,088 A | 12/1990 | Powers | |
| 5,025,061 A * | 6/1991 | Ishidoya et al. | 524/539 |
| 5,111,628 A | 5/1992 | Desjoyaux et al. | |
| 5,155,872 A | 10/1992 | Aymes | |
| 5,330,151 A * | 7/1994 | Boyack | 249/83 |
| 5,419,656 A | 5/1995 | McKinnon | |
| 5,590,493 A * | 1/1997 | Wilson | 52/108 |
| 6,387,252 B1 | 5/2002 | Desjoyaux et al. | |
| 6,503,391 B2 | 1/2003 | Desjoyaux et al. | |
| 7,797,887 B2 | 9/2010 | Maupas | |
| 2008/0302048 A1 | 12/2008 | Epple | |

FOREIGN PATENT DOCUMENTS

| | | |
|---|---|---|
| EP | 1418293 | 12/2004 |
| FR | 2 686 364 A1 | 7/1993 |
| FR | 2686364 | 7/1993 |
| FR | 2 740 806 A1 | 5/1997 |
| FR | 2740806 | 5/1997 |
| FR | 2 797 651 A1 | 2/2001 |
| FR | 2797651 | 2/2001 |
| WO | WO2005003492 | 1/2005 |

OTHER PUBLICATIONS

EP Application No. 12170308.6 Office Action mailed Dec. 5, 2012 (19 pages).

European Search Report for Application No. EP12170308 dated Nov. 28, 2012.

* cited by examiner

POOL LINER RETAINING SYSTEM

CROSS REFERENCE TO RELATED APPLICATIONS

This application claims benefit to U.S. Provisional Patent Application Ser. No. 61/492,166, filed on Jun. 1, 2011, which is incorporated by reference in its entirety.

FIELD

This document relates to a pool liner retaining system, and in particular to a pool wall structure that includes a plurality of interlocked panels for constructing a pool.

BACKGROUND

The construction of swimming pools involves a series of steps that includes excavation of soil, formation of a pool wall structure, and then the completion of the remaining portions of the pool, such as the pool lining and pool deck. The formation of the pool wall structure is a particularly crucial and labor-intensive phase of the pool construction process. In particular, the pool wall structure must conform to the dimensions and design features of the pool design, such as wall curvature, while also providing structurally sound support to contain the weight of the pool water within the pool after construction.

Pool designs featuring a vinyl liner supported by a surrounding pool wall structure have greatly simplified the pool construction process. However, the assembly of the pool wall structure remains a relatively labor intensive task using existing pool construction methods. Some existing construction methods rely on aligning continuous sheets of material that surround the perimeter of the pool to construct the pool wall structure; however, pool wall structures constructed using this method are difficult to maintain in a vertical aligned position required during the initial placement of the sheets and the pouring of reinforcing concrete around the outer perimeter of the pool wall structure during construction.

Other existing methods use modular panels that are fastened together at their edges to form the pool wall structure. However, modular panels are typically assembled using any number of tools and fasteners, thereby making the assembly process relatively more difficult and time consuming. Further, in order to achieve a particular design feature of the pool, such as curved walls and corners, a variety of sizes and shapes of modular panels may be required, thereby further increasing the complexity of the pool construction process. In addition, the pool wall structures formed from existing modular panels may still be difficult to maintain in position during the pouring of concrete.

Still other existing methods make use of modular panels that are either hollow or incorporate a concrete form, such as a chimney, to contain an amount of reinforcing concrete being poured. Although these methods require considerably less reinforcing concrete, it is difficult to direct the concrete into the hollow panels or chimneys during the construction process, and typically the reinforcing concrete must be poured in phases to avoid the sagging of the modular panels or other alignment issues. In the case of pool wall structures constructed using modular panels with integrated chimneys or other concrete forms, the modular panel is only supported in the discrete regions adjacent or proximate to the chimneys, and therefore the remaining areas of the modular panels may be vulnerable to structural failures over time. In addition, these modular panels, like the modular panels described previously, remain relatively complex to assemble.

SUMMARY

In one embodiment, a pool wall structure may include a plurality of interlocking panels forming a continuous closed wall around the perimeter of a pool, wherein each of the plurality of interlocking panels comprises a male flexible portion and a female flexible portion situated on opposite sides of an interlocked edge between an adjacent pair of interlocking panels within the plurality of interlocking panels, and wherein the male flexible portion and the female flexible portion deform along an axis parallel to the interlocked edge to form a faceted curve shape within the continuous closed wall.

In another embodiment, a pool wall structure may include a plurality of interlocked panels forming a continuous closed wall around the perimeter of a pool, wherein each of the plurality of interlocking panels includes a concrete support contained within a support membrane attached to each of the plurality of interlocking panels along an interlocked edge between any adjacent pair of interlocking panels of the plurality of interlocking panels.

In yet another embodiment, a pool wall structure may include a plurality of interlocking panels forming a continuous closed wall around the perimeter of a pool, wherein each of the plurality of interlocking panels comprises a male edge and a female edge formed opposite to the male edge with the male edge of each of the plurality of panels being interlocked with a corresponding female edge of an adjacent one of the plurality of interlocking panels. Each of the plurality of interlocking panels may further include a concrete support contained within a support membrane, wherein the support membrane is attached to each of the plurality of interlocking panels along an interlocked edge comprising an interlocked male edge and female edge.

In a further embodiment, a panel for the construction of a pool wall structure may include a flat body portion defining a male edge and a female edge. A male flexible portion may be positioned adjacent to the male edge having a first deformable region extending along the height of the panel, while a female flexible portion may be positioned adjacent to the female edge having a second deformable region extending along the height of the panel. Wherein the male edge extends along a height of the flat body portion and includes a male side plate and a tongue and the female edge is positioned opposite to the male edge and includes a groove and a keeper, wherein the groove is shaped to receive a second tongue of a second panel in an interlocked tongue-and-groove arrangement. The keeper may include a first and a second flange forming a channel shaped to receive a support membrane flap and a retaining rod.

In one embodiment, a method of constructing a pool wall structure may include:
  obtaining a plurality of interlocking panels, wherein each interlocking panel of the plurality of interlocking panels includes a male edge comprising a tongue and a female edge comprising a groove and a keeper, wherein the male edge, female edge, and keeper extend along the height of each interlocking panel of the plurality of interlocking panels;
  slideably engaging the male edge of each interlocking panel with the female edge of an adjacent panel in an interlocked arrangement for the plurality of interlocking panels to form a continuous wall around a perimeter of the swimming pool;

attaching a support membrane at each keeper of the continuous wall, wherein;
the support membrane comprises a continuous sheet of material extending around the perimeter outside of the plurality of interlocking panels; and
the support membrane forms a plurality of pockets wherein each pocket of the plurality of pockets extends the height of each interlocking panel and wherein each pocket defines an upper end and a lower end, wherein the upper end and the lower end are both open;
pouring a locking ring comprising a concrete layer extending to the lower end of each panel; and
filling each of the plurality of pockets at each upper end of each panel to form a plurality of concrete supports, wherein each of the plurality of concrete supports extends the height and width of each of the plurality of interlocking panels.

Additional objectives, advantages and novel features will be set forth in the description which follows or will become apparent to those skilled in the art upon examination of the drawings and detailed description which follows.

BRIEF DESCRIPTION OF THE DRAWINGS

The following figures illustrate various aspects of the pool liner retaining system.

Corresponding reference characters indicate corresponding elements among the various views of the drawings. The headings used in the figures should not be interpreted to limit the scope of the claims.

DETAILED DESCRIPTION

As described herein, a pool liner retaining system having a pool wall structure, which is a modular structure having a plurality of interlocking panels with associated concrete supports formed within membrane pockets attached at the edges of each respective interlocking panel. The design of the interlocking panels overcomes many of the issues associated with existing pool wall structures. In particular, the sliding engagement of the interlocking panels along their edges in a tongue-and-groove arrangement is a joining mechanism that may be accomplished without the use of on-site tools, and results in the precise arrangement of the interlocking panels. The inclusion of flexible regions near the edges of each interlocking panel allows the interlocking panels to be arranged in a wide variety of faceted curved shapes with either positive or negative curvature without the need for custom-built curved panels to accomplish the same. The concrete molds forming the concrete support structures are fabricated through the attachment of a support membrane at the mating edges of each interlocking panel using a simple, tool-free pool liner retaining system such that the resulting concrete support extends over a significantly larger area of the pool wall structure compared to existing panel-based pool wall structures.

The structured elements of the pool wall structure, the interlocking panels constituting the pool wall structure, and methods of assembling the pool wall structure using the interlocking panels are described in greater detail below.

I. Pool Wall Structure

Figure 1:
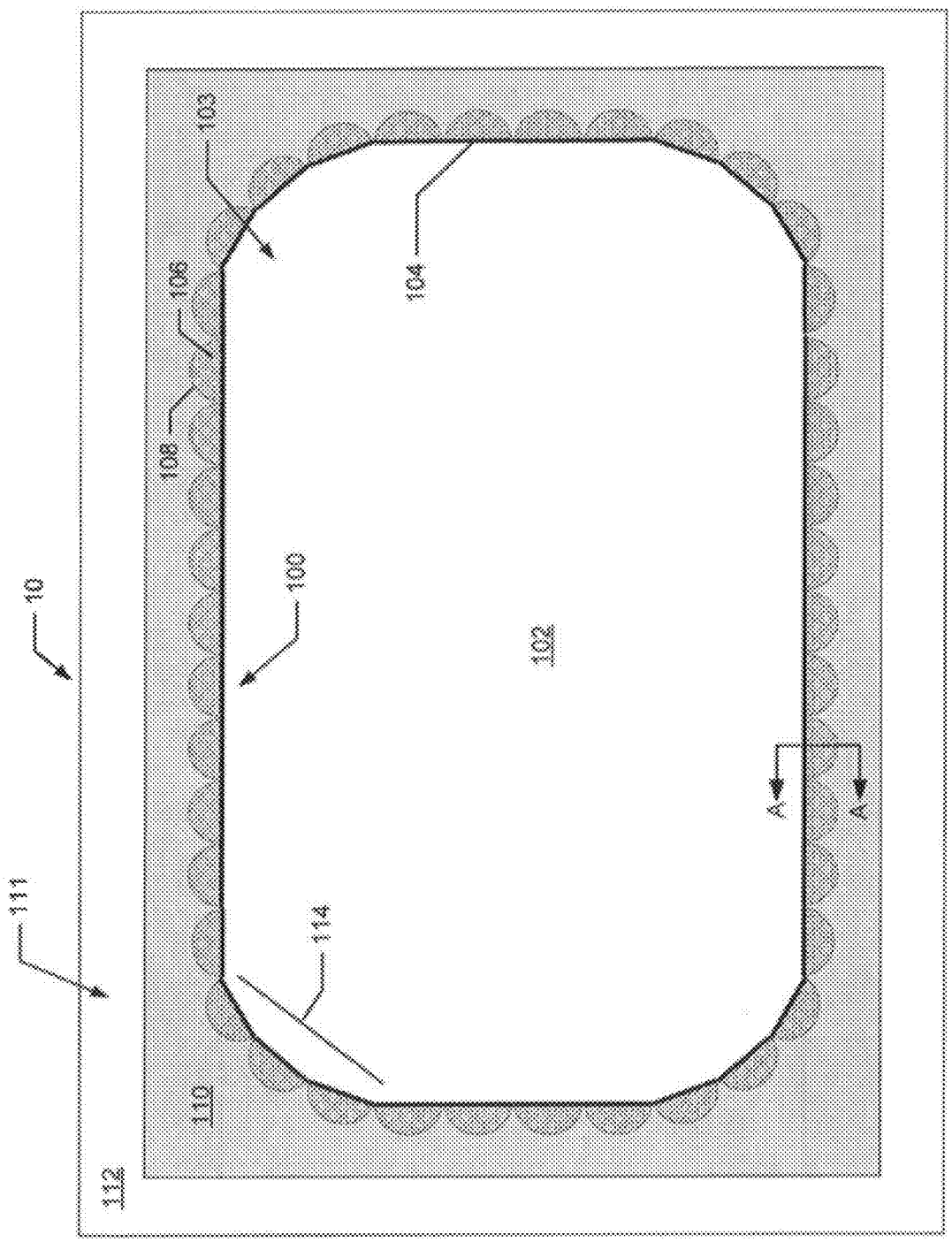
FIG. 1 is a simplified illustration of a swimming pool construction site showing a pool wall structure.

Referring to FIG. 1, a pool wall structure, designated 100, may be constructed of a plurality of interlocking panels 104 that are slideably engaged to each interlocking panel at respective adjoining edges to construct a swimming pool 10. The swimming pool 10 may be an in-ground pool formed by excavating the soil beneath a landscape surface 112 to form an excavated volume 111. The excavated volume 111 may be formed by a pool bottom 102 that defines the lower surface of the swimming pool 10 and an over-dig 110 that forms a horizontal surface at a depth below the landscape surface 112 corresponding to the bottom portion of a plurality of interlocking panels 104 forming the pool wall structure 100. Each interlocking panel 104 may be structurally reinforced by a concrete support 106 that extends the full height and width of each interlocking panel 104. In addition, each concrete support 106 is surrounded by a respective interlocking panel 104 and a support membrane 108 is attached to each edge of the respective panel 104. In one embodiment, the plurality of interlocking panels 104 may be engaged together in a sliding tongue-and-groove engagement to form faceted curved shapes 114 due to the incorporation of flexible regions near the edges of each interlocking panel 104 as described greater in detail below.

Figure 2:
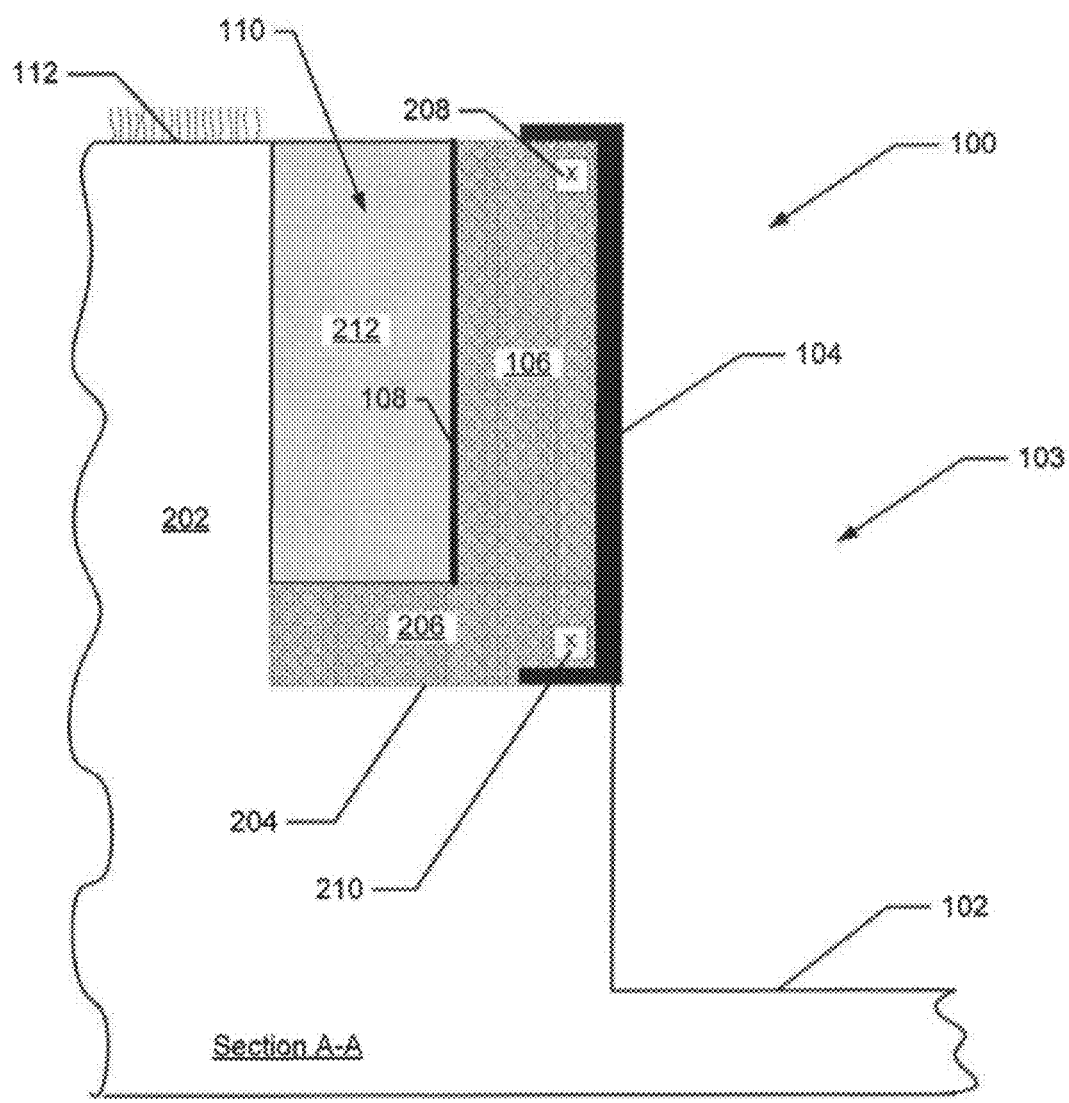
FIG. 2 is a partial cross-sectional view of the pool wall structure.

A cross-section of the swimming pool 10 illustrating the pool wall structure 100 is shown in FIG. 2. The excavation may be dug directly into the soil 202 and extend the full depth of the swimming pool 10 from the landscape surface 112 to the pool bottom 102. The over-dig 110 may extend outwardly from the pool volume 103 forming an over-dig lower surface 204. The interlocking panels 104 forming the pool wall structure 100 may rest on the over-dig lower surface 204 and further held in position by a concrete locking ring 206 poured into the over-dig 110 to overlap with a bottom portion of each panel 104. In one embodiment, each concrete support 106 may contact and adhere to the concrete locking ring 206, thereby forming a continuous structural support for the pool wall structure 100. In another embodiment, the concrete locking ring 206 and each concrete support 106 may be coincidentally poured and cured together, forming a continuous concrete structural support for the pool wall structure 100.

In one embodiment, the pool wall structure 100 may further include an upper reinforcing member 208 and a lower reinforcing member 210. Both the upper and lower reinforcing members 208 and 210 may extend continuously around the perimeter of the pool wall structure 100 adjacent or proximate to the upper and lower ends of the interlocking panels 104. The upper and lower reinforcing members 208 and 210 may include a series of discrete elongate pieces that are mechanically attached or spliced to one another to form continuous reinforcing bands around the upper and lower portions of the pool wall structure 100, respectively.

To provide additional structural stability, the remaining volume of the over-dig 110 that is not occupied by either the locking ring 206 or the concrete supports 106 may be filled in with a filler material 212. In some embodiments, any known construction backfill material may be used as a filler material, including but not limited to concrete, crushed rock, gravel, fill dirt, topsoil, and any combination thereof.

II. Pool Wall Panel

Figure 3:
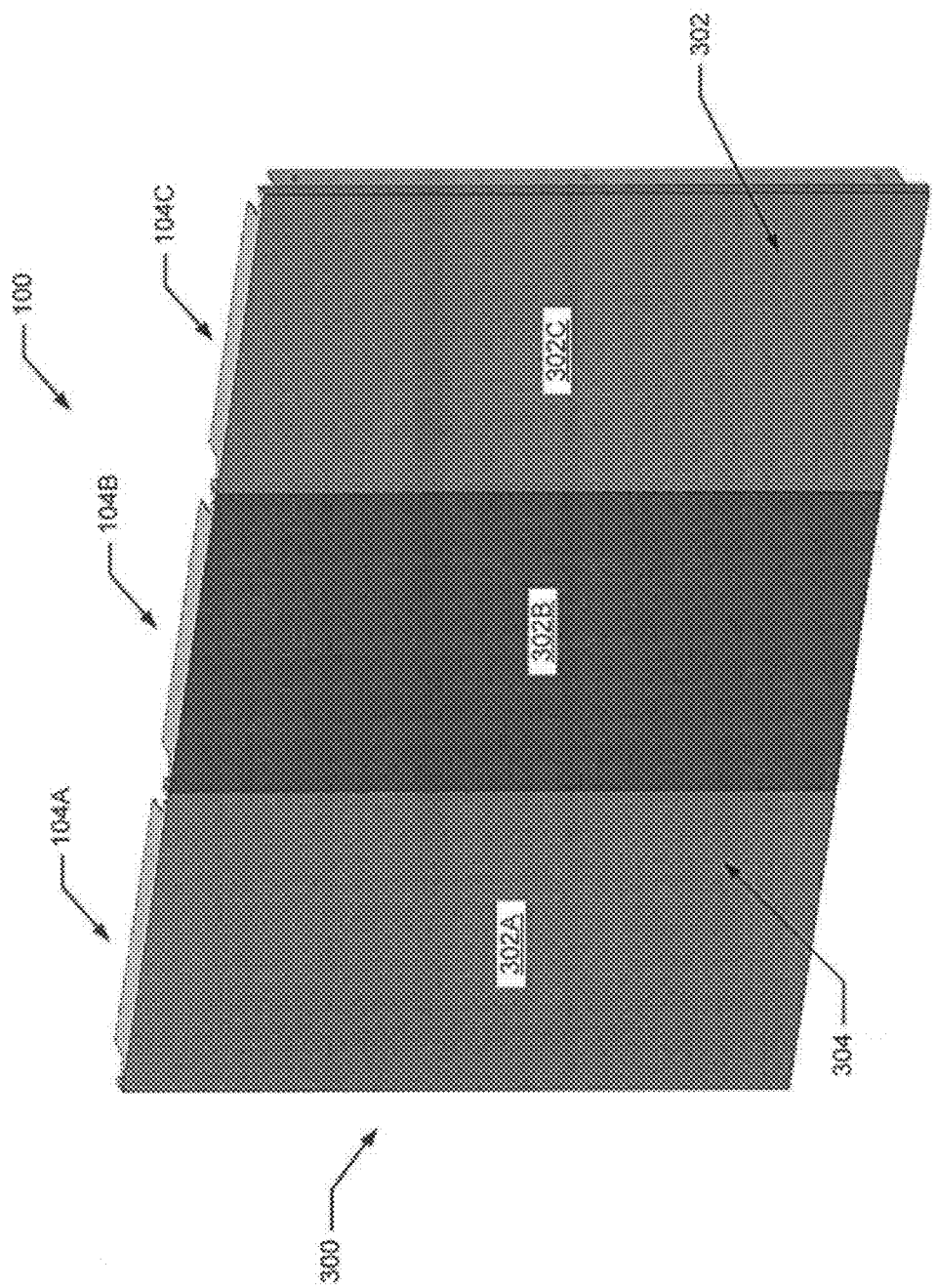
FIG. 3 is a perspective view of an inner surface of an assembled section of the pool wall structure.

The pool wall structure 100 is made up of a plurality of interlocking panels 104. A representative section 300 of the pool wall structure 100 is illustrated in FIG. 3. Each of the interlocking panels 104 includes a respective flat body portion 302, designated 302A, 302B, and 302C. In one example arrangement, the interlocking panel 104B may be interlocked with corresponding adjacent interlocking panels 104A and 104C, to form a flat pool wall surface 304 that extends over the entire perimeter of the pool wall structure 100. A pool liner (not shown) may be supported by the pool wall structure 100 such that the pool liner covers the pool wall surface 304 and the remaining interior surface of the swimming pool 10.

In one embodiment, each interlocking panel 104 may have been an overall height of about 4 feet and an overall width of about 12 inches. In other embodiments, the panels 104 may have a variety of overall widths ranging between 4 inches to 12 inches, while the overall height may range between 42 inches to 48 inches in order to accommodate a wider range of pool wall contours.

Figure 10:
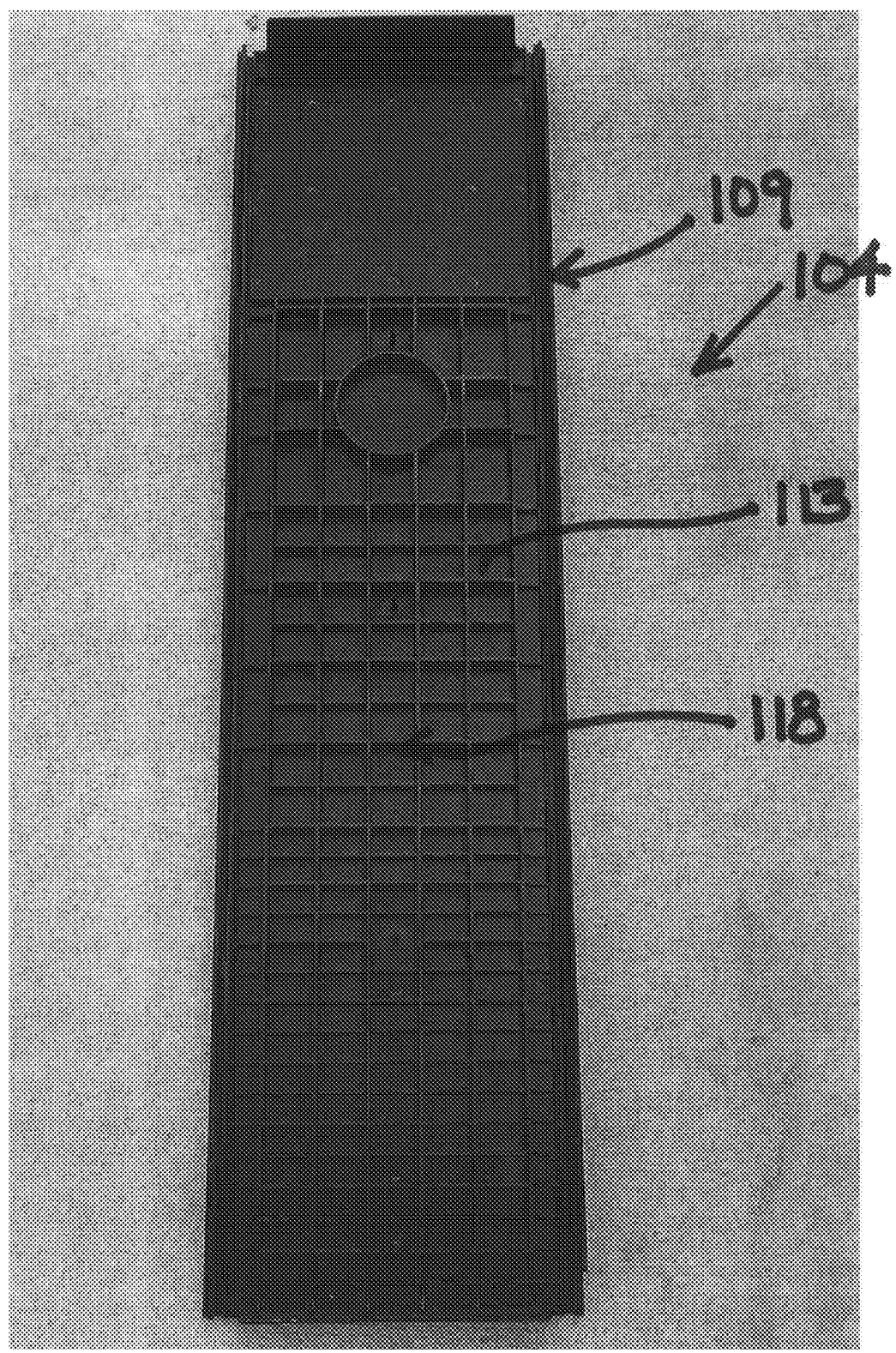
FIG. 10 is a front view of another embodiment of one of the plurality of interlocking panels.

Referring to FIG. 10, one embodiment of an interlocking panel 104 may have substantially the same configuration of the other interlocking panels 104 except the interlocking panel 104 of FIG. 10 may define a body 109 that defines a rear surface 113 in which ribbing 118 is defined along the rear surface 113. The ribbing 118 is configured to provide structural support to the interlocking panel 104 such that the interlocking panel 104 may withstand the pressure applied by the concrete used to form the concrete support 106 including preventing deflection of the interlocking panels 104, such as bending or curvature of any kind.

The interlocking panels 104 may be constructed of any suitable material capable of being fabricated with the shapes and structures described herein below. Non-limiting examples of suitable materials include metals such as steel or aluminum, and molded plastics. In one aspect, the interlocking panels 104 may be constructed from a material including polypropylene with a glass filler material.

In some embodiments, various substructures of the interlocking panels 104 described herein below, including but not limited to the upper and lower panel plates, male and female side plates, and the flat panel body may be fabricated as an integrated structure from a molded plastic using any known process including but not limited to injection molding. Other panel structures and parts may be fabricated from additional materials, as described herein below.

a. Upper and Lower Panel Plates

Figure 4:
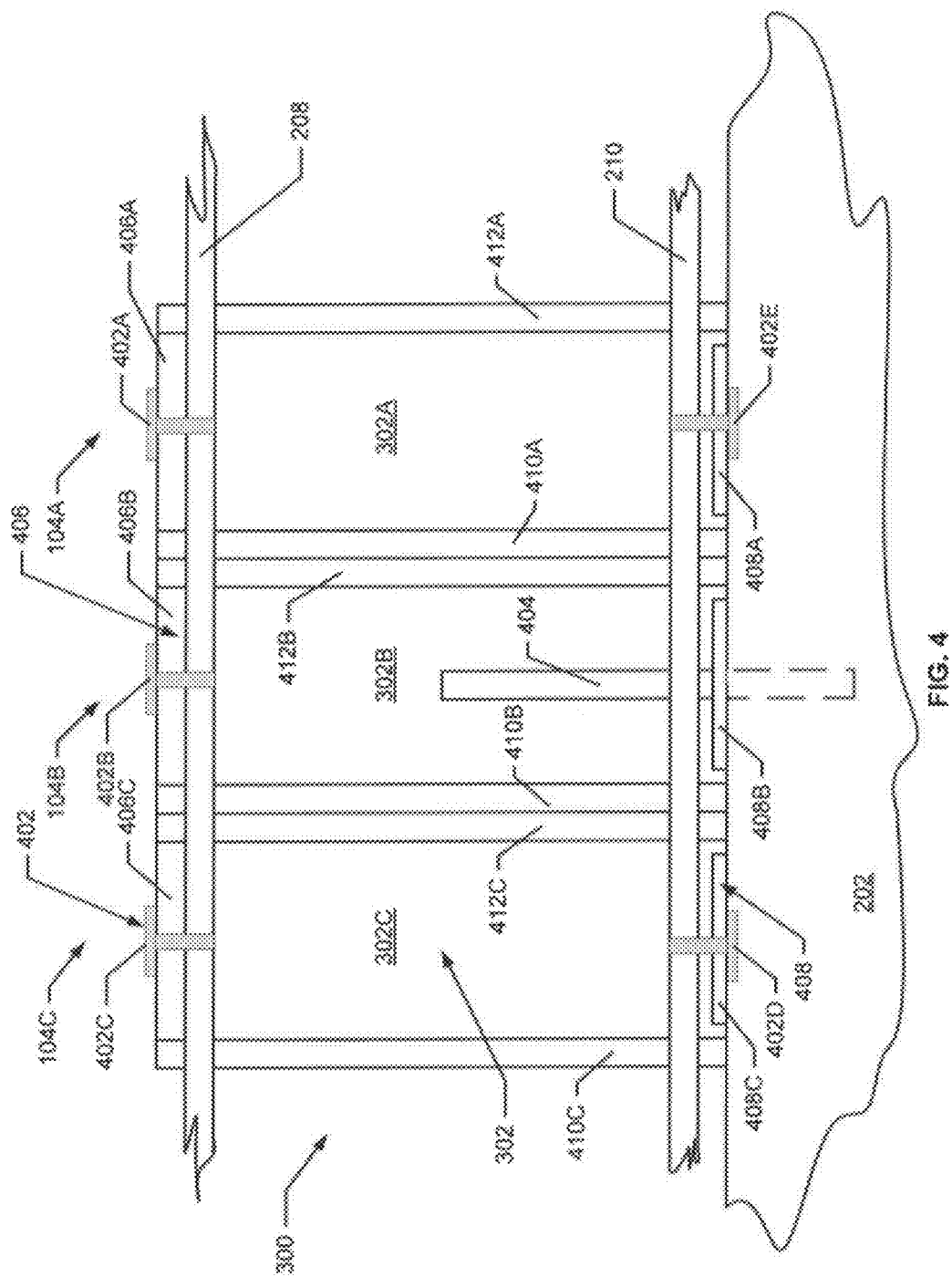
FIG. 4 is a simplified illustration of an outer surface of the assembled section of the pool wall structure showing a plurality of interlocking panels.

Referring to FIG. 4, a simplified illustration of the section 300 of the pool wall structure 100 viewed opposite to the flat pool wall surface 304 (FIG. 3) is shown. In one embodiment, the opposite sides of the flat body portions 302A-302C are shown interlocked as previously shown in FIG. 3. For each interlocking panel 104, an upper panel plate 406 and a lower panel plate 408 may extend perpendicularly outward from the flat body portion 302 at the upper and lower edges of each interlocking panel 104, respectively.

In one embodiment, the upper reinforcing member 208 may be attached to a respective upper panel plate 406, designated 406A-406C, using one or more fasteners 402. The attachment of the upper reinforcing member 208 to each upper panel plate 406 enhances the structural integrity of the pool wall structure 100. Similarly, in one embodiment the lower reinforcement member 210 may be attached to a respective lower panel plate 408, designated 408A-408C, using one or more fasteners 402, designated 402D and 402E. In one embodiment, the upper and lower reinforcing members 208 and 210 may be shaped into straight or curved sections to follow the specified curvature and contour of each section 300 of the pool wall structure 100.

The upper reinforcing member 208 and lower reinforcing member 210 are constructed to resist structural loads imposed on the interlocking panels 104 due to the weight of the concrete during the pouring of the locking ring 206 (FIG. 2) and the concrete supports 106 (FIG. 2) to maintain the position of the interlocking panels 104 in their specified locations. In addition, the upper and lower reinforcing members 208 and 210 may provide the structural integrity of the pool wall structure 100 under the hydrodynamic pressure loads imposed on the pool wall surface 304 after the completed pool 10 is filled with water for use.

The upper and lower reinforcing members 208 and 210 may be constructed using any known rigid elongate structural member including but not limited to tubular members, such as tubular steel and solid-section elongate members, such as rebar. In one embodiment, the upper and lower reinforcing members 208 and 210 may be constructed from tubular steel stock having a square or rectangular cross-sectional shape. The cross-sectional dimensions and materials of the upper and lower reinforcing members 208 and 210 may be selected based on any one or more of at least several factors, including but not limited to: the anticipated maximum structural loads on the pool wall structure 100, the overall size and shape of the pool 10, the structural dimensions of the upper panel plate 406 and lower panel plate 408, the desired total weight of the upper and lower reinforcing members 208 and 210 and any combination thereof. In still other embodiments, the upper reinforcing member 208 and the lower reinforcing member 210 may be constructed from the same elongate material stock, or each of the upper and lower reinforcing members 208 and 210 may be constructed from different elongate material stocks.

The fasteners 402 used to attach the upper reinforcing member 208 to the upper panel plate 406 as well as attach the lower reinforcing member 210 to the lower panel plate 408 may be any known fastener, such as self-tapping screws, metal screws, bolts with threaded fittings within the upper and lower reinforcing members 208 and 210, nuts and bolts, rods and cotter pins, solid rivets, blind rivets, and any combination thereof.

In one embodiment, the upper and lower reinforcing members 208 and 210 typically extend over at least two adjacent interlocking panels 104. In another embodiment, discrete pool wall sections 300 of two or more engaged interlocking panels 104 may be assembled at a remote site situated away from the pool construction area. In this aspect, an upper reinforcing member 208 extending about the total width of the pool wall section 300 may be attached to the upper panel plates 208, and a similarly-sized lower reinforcing member 210 may be attached to the lower panel plates 210. The reinforced pool wall sections 300 may be assembled together at the pool construction site and the ends of the upper reinforcing members 208 may be spliced together to form a continuous structural member. Similarly, the ends of the lower reinforcing members 210 of the assembled pool wall sections may be spliced together. A more detailed description of assembly of the pool wall structure 100 is discussed below.

The splicing of the ends of the upper and lower reinforcing members 208 and 210 may be accomplished using any known materials and methods. In one aspect, the ends of the adjacent upper and lower reinforcing members 208 and 210 may be spanned using one of more splice plates (not shown) fastened to the inner or outer surfaces of the adjacent upper and lower reinforcing members 208 and 210. In another aspect, a tubular splice fitting sized to slip over the adjacent ends of each adjacent upper and lower members 208 and 210 or inside the inner lumens (not shown) of adjacent tubular upper and lower members 208 and 210 may span across the adjacent ends of the adjacent tubular upper and lower members 208 and 210. The splice plates and/or tubular splice fittings may be fastened to the one or more ends of the upper and lower reinforcing members 208 and 210 using any known fastening materials and methods, for example self-tapping screws, metal screws, bolts with threaded fittings within the upper and lower reinforcing members 208 and 210, splice plates, and/or tubular splice fittings, nuts and bolts, rods and cotter pins, solid rivets, blind rivets, and any combination thereof. In yet another aspect, the ends of adjacent upper and lower reinforcing members 208 and 210 may be directly joined using existing methods, such as welding.

In some embodiments, one or more reinforcing bars 404 may be included in the pool wall section 300. Each reinforcing bar 404 may extend downward through vertically-aligned holes drilled through the lower reinforcing member 210 as well as the lower panel plate 408 and into the soil 202 below the pool wall section 300. In addition, each reinforcing bar 404 may extend upward through a concrete support 106 associated with the panel 104, which holds each reinforcing bar 404 in position. The reinforcing bar 404 may extend upward to a distance from about three feet to about six feet above the upper edge of the interlocking panel 104, and may be bent over in a horizontal orientation in the region above the wall section 300 to form a supporting structure for a pool deck (not shown) around the perimeter of the swimming pool 10.

b. Male and Female Edges and Locking Mechanism

Referring again to FIG. 4, the interlocking panel 104B may be interlocked with adjacent panels 104A and 104C at male edge 410B and female edge 412B of the interlocking panel 104B. The left/right locations of the male edge 410B and female edge 412C may be specified arbitrarily as long as the male and female edges 410B and 412C of panel 104B are consistently positioned for interlocking alignment with adjacent panels 104A and 104C. In an aspect, the male edge 410 and female edge 412 of the adjacent interlocking panels 104 may be engaged in a tongue-and-groove mechanism. For example, the male edge 410B of interlocking panel 104B may interlock with the female edge 412C of adjacent interlocking panel 104C. Similarly, the female edge 412B of interlocking panel 104B may interlock with the male edge 410A of the adjacent interlocking panel 104A. Similarly, the male edge 410C of interlocking panel 104C would be engaged to the female edge 412 of another adjacent interlocking panel 104 (not shown), while female edge 412A of interlocking panel 102A would be engaged to the male edge 410 of another adjacent interlocking panel 104 (not shown).

Figure 5:
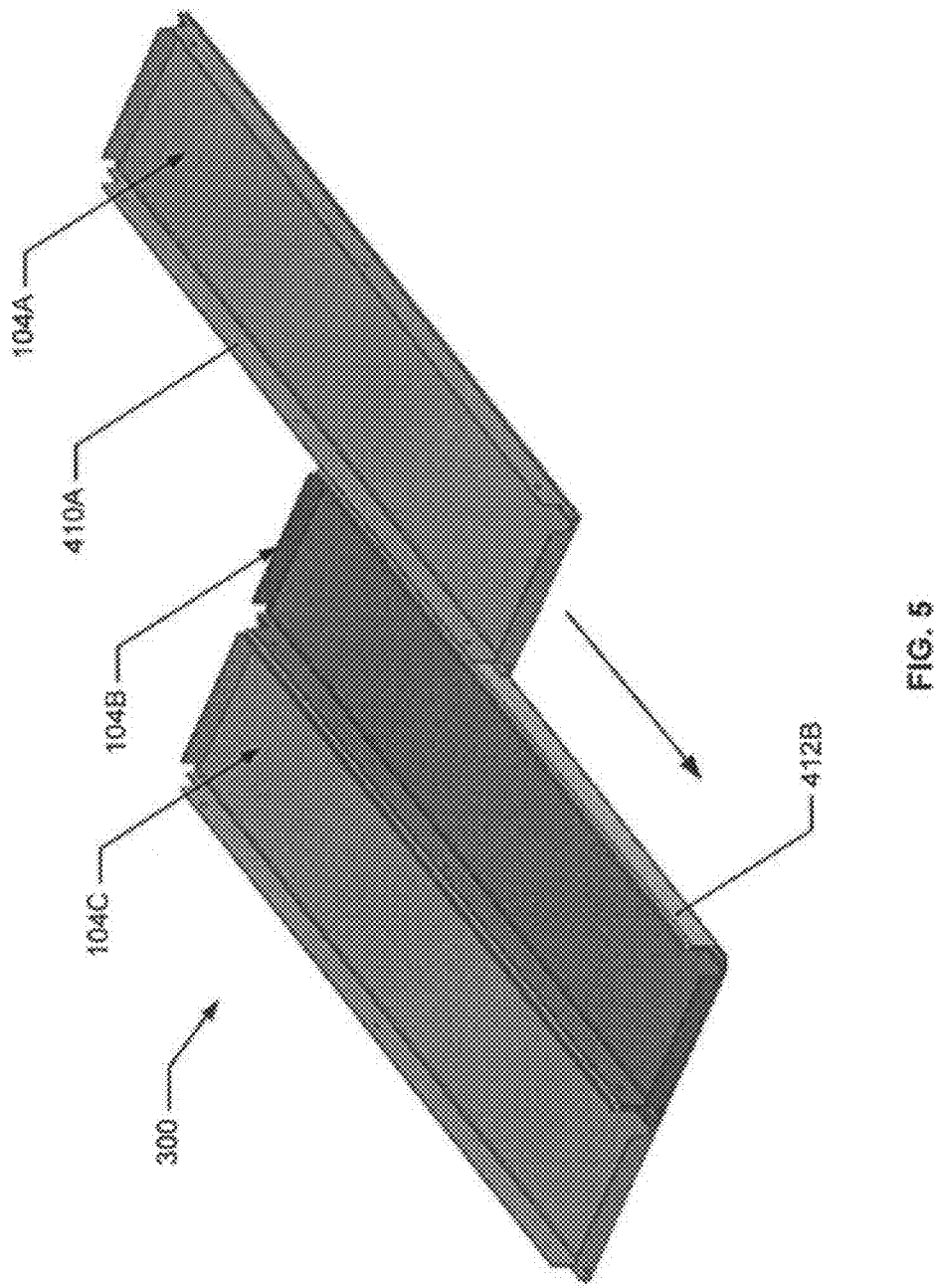
FIG. 5 is a perspective view of a partially assembled section of the pool wall structure showing the engagement of the interlocking panels.

Each of the adjacent interlocking panels 104, for example 104A and 104B, may be joined by sliding adjoining respective male and female edges 410A and 412B relative to each other in a direction parallel to the male and female edges 410A and 412B, as illustrated in FIG. 5. As shown, the male edge 410A includes a protruding edge which fits into a corresponding slot included within the female edge 412B.

Figure 6:
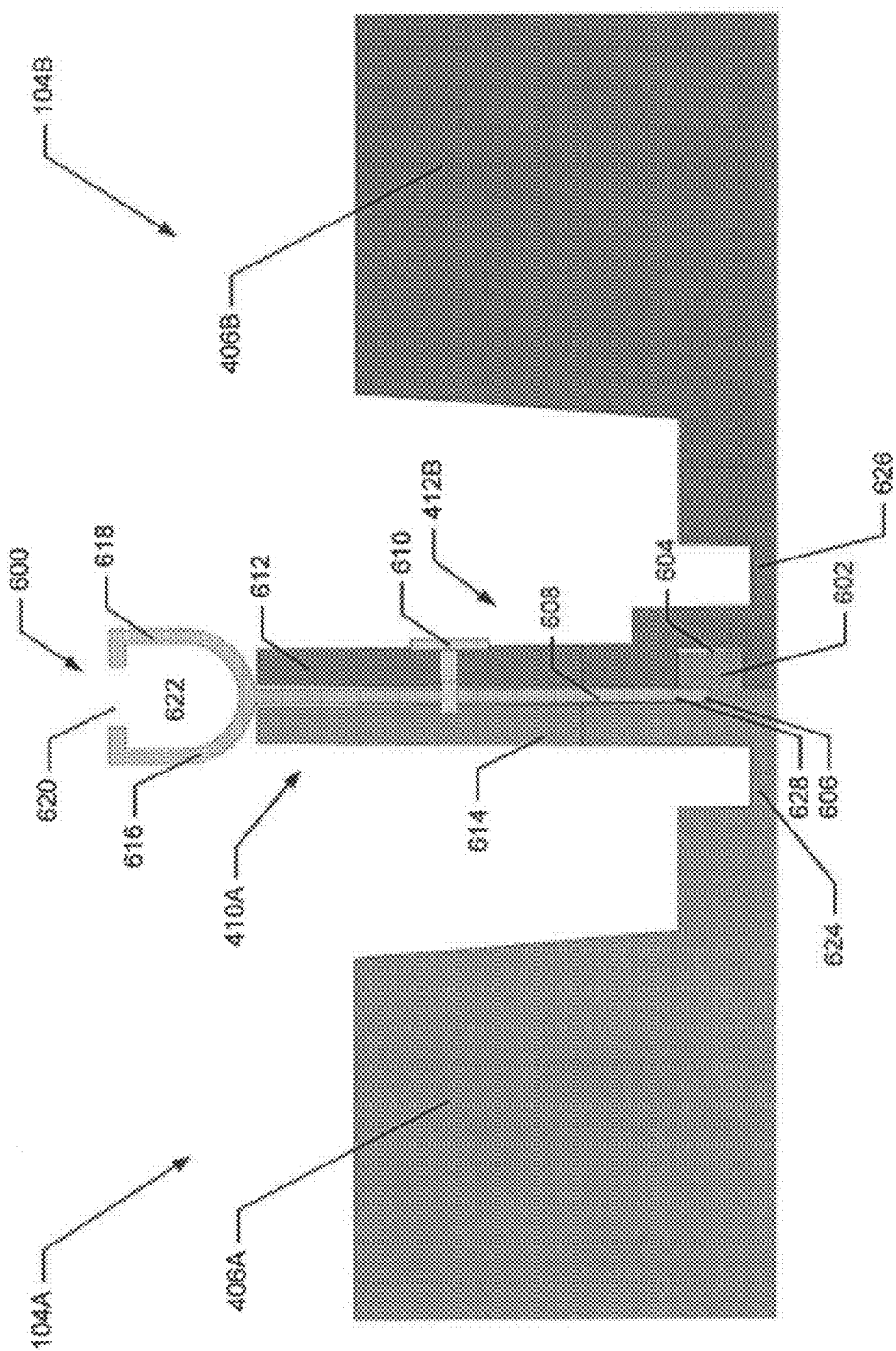
FIG. 6 is a top view of two mating edges of two adjacent interlocking panels illustrating the engagement between the interlocking panels.

A cross-sectional view of interlocking panels 104A and 104B is illustrated in FIG. 6. The male edge 410A of interlocking panel 104A may include a tongue 602, which extends approximately the full height of the interlocking panel 104A in the form of a protruding ridge. The cross-sectional profile of the tongue 602 substantially matches the profile of a groove 604 formed in the material of the female edge 412B of the adjacent interlocking panel 104B. The tongue 602 and groove 604 of adjacent interlocking panels 104 mechanically fit together in a tongue-and-groove configuration, thereby fastening adjoining interlocking panels 104 without the use of specialized tools or separate fasteners, which significantly simplifies the process of assembling the pool wall structure 100. Further, the tight tolerances of the interlocked tongue 602 and groove 604 assure a precise alignment of interlocking panels 104 within the pool wall structure 100.

c. Male and Female Side Plates and Keeper

As further shown in FIG. 6, each interlocking panel 104A and 104B includes a male side plate 614 associated with a male edge 410A and a female side plate 612 associated with the female edge 412B. The male side plate 614 and the female side plate 612 extend in a substantially perpendicular direction from the flat body 302 of the interlocking panel 104, and further extend in a direction parallel relative to the male and female edges 410A and 412B.

A keeper 600 may also be included for providing an attachment fitting for the support membrane 108 (FIG. 7) used to form the concrete support 106 (FIG. 1). In one embodiment, each keeper 600 may include a first flange 616 and a second flange 618 projecting in an outward direction from between the male side plate 614 and the female side plates 612. The first flange 616 and second flange 618 may be attached to a body 608 that is attached to the female edge 412B using at least two or more fasteners 610. In one embodiment, the body 608 may be attached to the female side plate 612 using three fasteners spaced along the height of the female side panel 612.

Any known fastener 610 may be used to attach the keeper body 608 to the female side plate 612, for example self-tapping screws, metal screws; nuts and bolts, solid rivets, blind rivets, and any combination thereof.

In some embodiments, the keeper body 608 may be a flat strip extending nearly the full length of the female side plate 612. When adjacent interlocking panels 104A and 104B are engaged, the body 608 may be interposed between the female side plate 612 and the male side plate 614, as shown in FIG. 6. In one aspect, the free end 628 of the keeper body 608 opposite to the flanges 616 and 618 may partially overlap the groove 604. In this aspect, the free end 628 may fit into a corresponding slot 606 formed in the tongue 602 of the male edge 410.

In some embodiments, the keeper 600 may be attached to either the female or male side plates 612 and 614 of each interlocking panel 104, or the keeper 600 may be formed as an integral element of the interlocking panel 104. In another aspect, the keeper 600 may be formed from any known material exhibiting sufficient strength and fatigue resistance, including but not limited to plastics and metals.

The first and second flanges 616 and 618 form a channel 622 into which a fold of support membrane 108 and a retaining rod 704 may be inserted in order to anchor the support membrane 108 at the interlocked edges of the interlocking panels 104. An opening 620 situated between the flanges 616 and 618 provides external access for the fold of support membrane 108 without need for specialized tools.

d. Attachment of Support Membrane to Pool Wall Structure

Figure 7:
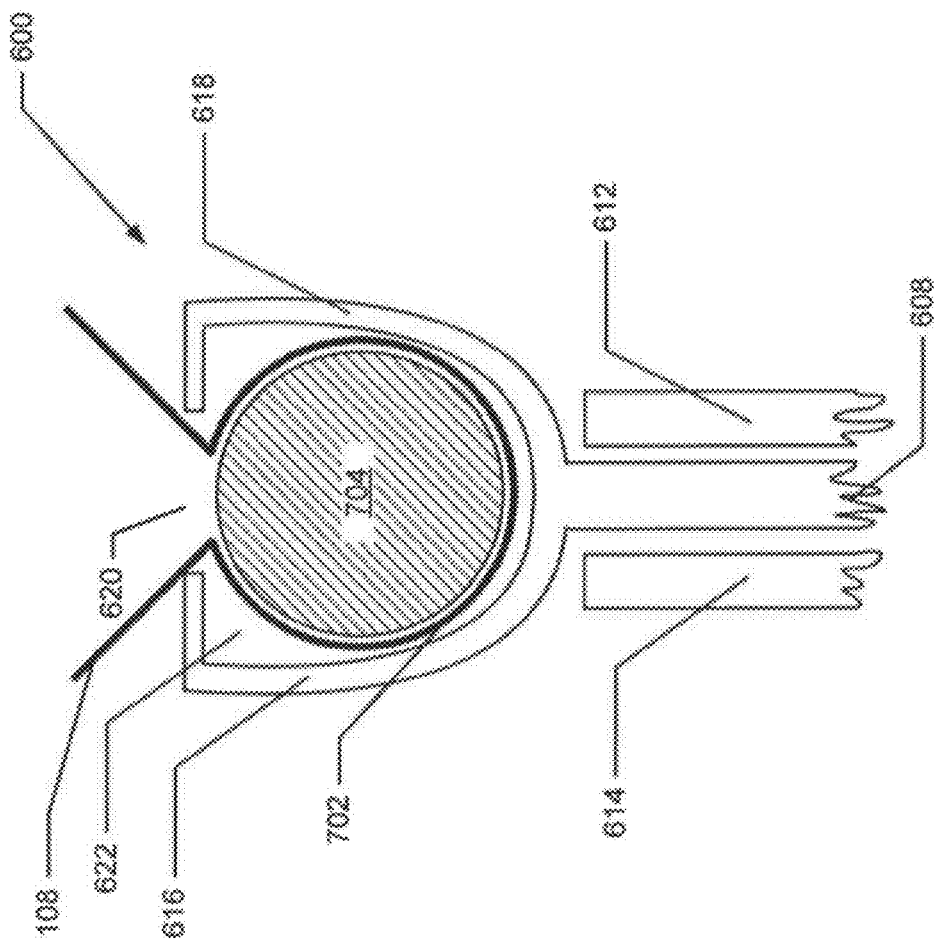
FIG. 7 is a cross-sectional view of a keeper for retaining a support membrane of the pool liner retaining system.

FIG. 7 is a cross-sectional view through the keeper 600, illustrating a flap of support membrane 702 held in place within the channel 622 by the retaining rod 704. The flap of support membrane 702 may be inserted through the opening 620 and into the channel 622 of the keeper 600. Once the flap 702 is in place within the channel 622, the retaining rod 704 may be inserted into the channel 622, causing the flap of support membrane 702 to be pressed against the inner surface of the channel 622, due to the relatively tight fit of the retaining rod 704 within the channel 622. One end of the retaining rod 704 may be inserted into an upper end of the channel 622 where the channel 622 opens at the upper end of the keeper 600. The retaining rod 704 may then be slid along the channel 622 in a downward direction parallel to side of the interlocking panel 104 until the retaining rod 704 occupies the full length of the channel 622. In this manner, the support membrane 108 may be attached to the pool wall structure 100 at the interlocked edges of the interlocking panels 104.

The retaining rod 704 may be produced from any suitable materials, including but not limited to metal, wood, and plastic. Non-limiting examples of suitable materials for the fabrication of the retaining rods 704 include extruded plastic and extruded aluminum. The length of the retaining rod 704 may be approximately equal to the overall length of the channel 622, and may be slightly longer than the channel to provide additional length to grip while inserting the retaining rod 704 into the channel 622.

The retaining rod 704 may be configured to fit closely within the channel 622 while allowing sufficient space within the channel 622 for the flap of supporting membrane 702, and sufficient free space to slip the retaining rod 622 the full length of the channel 622 without need for excessive force and without damaging the supporting membrane 108. For example, cross-sectional shapes may include a circular shape, square shape, triangular shape, elliptical shape, hexagonal shape, octagonal shape, or any combination thereof as long as the minimum cross-sectional dimension is larger than the width of the opening 620 of the channel 622.

e. Support Membrane and Concrete Support

Figure 8:
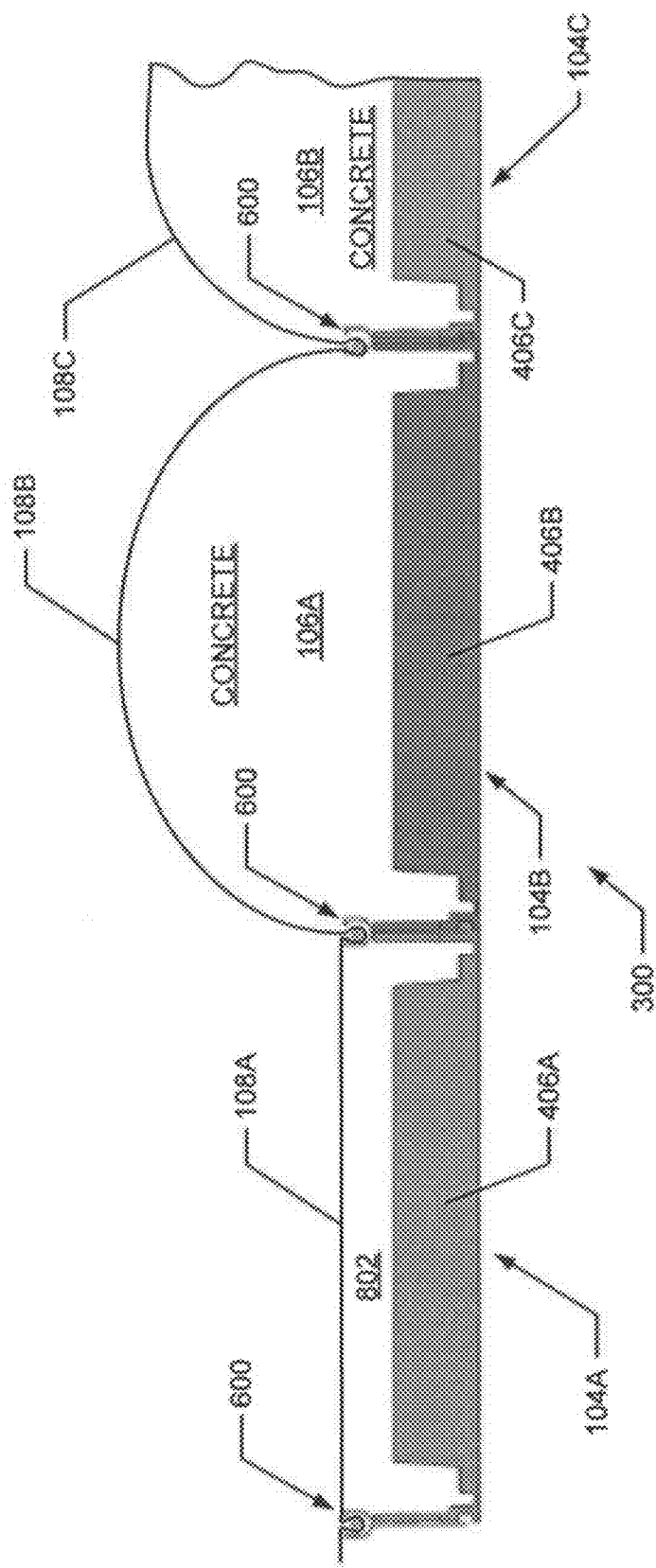
FIG. 8 is a top view of an assembled section of interlocking panels with the attached support membrane illustrating before and after the addition of the concrete within the support membrane.

Referring to FIG. 8, the concrete support 106, for example 106A and 106B, for a particular section 300, may be formed by inserting concrete into a pocket 802, for example formed between the upper panel plate 406A and the support membrane 108A once the membrane 108A is attached to each of the respective keepers 600 on the interlocking panels 104A-104C. The secured support membrane 108 is sealed nearly the full height of the interlocking panels 104A-104C along each of the keepers 600. A top view of the support membrane 108 secured in the keepers 600 is illustrated in FIG. 8 before and after the addition of concrete to form the concrete support 106A and 106B, respectively. The support membrane 108A and interlocking panel 104A may form a pocket 802 that is open at its upper and lower ends. This pocket 802 provides a form for receiving concrete for fabrication of the concrete support 106.

In some embodiments, a certain amount of concrete may be inserted into the open upper end of the pocket 802, resulting in the formation of a concrete support 106. As illustrated in FIG. 8, the support membranes 108B and 108C may stretch due to the weight of the inserted concrete between the support members 108B, 108C and upper panel plates 406B, 406C, respectively, that results in a rounded cross-sectional shape for the concrete supports 106A and 106B. The size and shape of the concrete support may be specified by any one or more of at least several factors, for example the amount of concrete added into the pocket 802, the thickness and/or elasticity of the supporting membrane material 108, the inclusion of reinforcing materials such as inextensible fibers into the support membrane 108, the tension of the secured supporting membrane 108 prior to the insertion of concrete, and any combination thereof.

In some embodiments, the concrete may migrate out of the lower end of the pocket 802 until an amount of concrete sufficient to effectively seal the lower end of the pocket 802 has accrued. The locking ring 206 (FIG. 2) may be of sufficient height above the over-dig lower surface 204 to seal off the lower end of the pocket 802. In this aspect, the concrete used to produce the locking ring 206 may be poured prior to the insertion of the concrete into the pockets 802 to form the concrete supports 106. Alternatively, the concrete used to produce the locking ring 206 and the concrete supports 106 may be poured concurrently.

f. Flexible Portions

Figure 9:
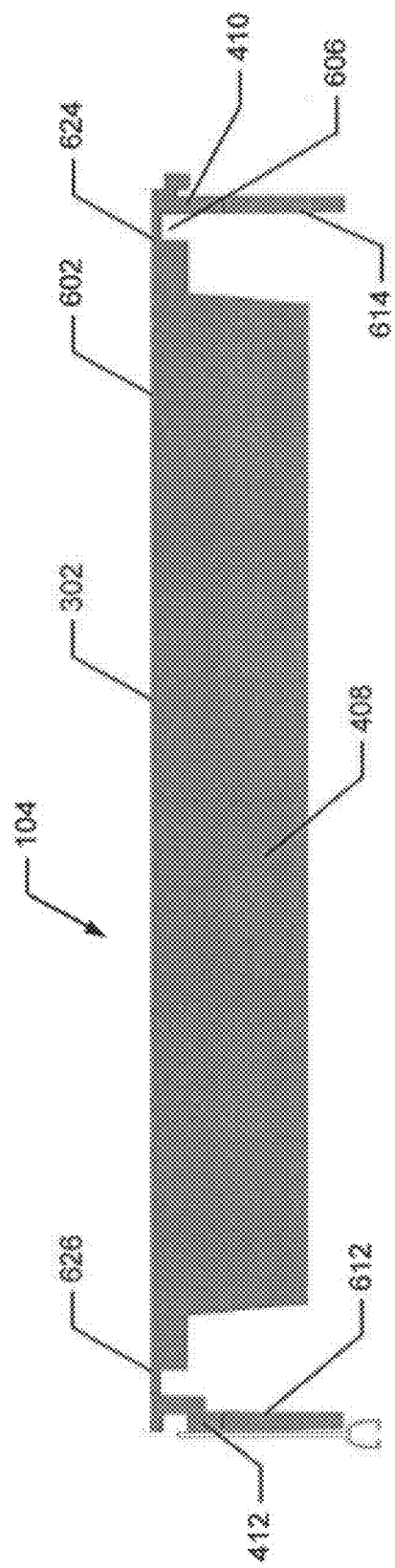
FIG. 9 is a bottom view of one of the plurality of interlocking panels.

In order to accommodate the construction of the curved wall geometry, each interlocking panel 104 may further include a male flexible portion 624 and a female flexible portion 626 as illustrated in FIGS. 6 and 9. Referring to FIG. 9, the male flexible portion 624 may be a thinner region of the flat body of the panel 302 that extends the full height of the interlocking panel 104 in a direction parallel with the male side plate 614 near the male edge 410 of the interlocking panel 104. In this embodiment aspect, the female flexible portion 626 may be a thinner region of the flat body of the panel 302 that extends the full height of the interlocking panel 104 in a direction substantially parallel with the female side plate 612 near the female edge 412 of the interlocking panel 104. The thinner material of the male and female flexible portions 624 and 626 results in a weakened region relative to the surrounding material of the flat body of panel 302, thereby rendering the male and female flexible portions 624 and 626 capable of deforming at an angle of up to about 30 degrees under sufficient bending moment. Because of the vertical orientation of the flexible portions 624 and 626, the ends of the panel deform about a vertical axis, thereby preserving the desired vertical orientation of all interlocking panels 104 in the pool wall structure 100.

The inclusion of the flexible portions 624 and 626 makes possible the formation of a curved wall segment in which the flat faces of the interlocking panels 104 are bent toward adjacent respective interlocking panels 104 or away from adjacent respective interlocking panels 104. As a result, a wall section 300 may be formed using a plurality of interlocking panels 104 into a faceted curved shape 114 (see FIG. 1), in which the curvature is approximated by the flat faces of the interlocking panels 104 with discrete bends at the flexible portions 624 and 626. In one aspect, if each interlocking panel 104 has an overall width of about 12 inches, a curved wall with a radius of curvature as low as 2 feet may be assembled. Tighter curves may be assembled using panels with narrower widths including but not limited to 8 inches wide and 4 inches wide, In one embodiment, the upper and lower panel plates 406 and 408 extend less than the full width of the interlocking panel 104 to accommodate a curvature in which the flat faces of the interlocking panels 104 are bent away from each other. In this aspect, if the upper and lower panel plates 406 and 408 extended the full width of the interlocking panels 104, the edges of the plates 406 and 408 near the interlocked edges of the interlocking panels 104 would physically interfere with each other if the interlocking panels 104 were bent with the flat faces away from each other.

III. Construction of Pool Wall Structure

In one method, a pool wall structure 100 may be constructed using the interlocking panels 104 and associated materials, parts, and assembly methods described herein. The site at which the swimming pool 10 is to be constructed may be prepared by excavating a volume of soil 202 from beneath the landscape surface 112. The excavated volume 111 includes a deeper central portion forming the pool volume 103 which extends from the level of the landscape surface 112 down to the bottom surface of the pool 102. A shallower over-dig 110 is also excavated around the perimeter of the deeper central portion, which is sized to contain the pool wall structure 100. The over-dig 110 may extend down about 4 feet to accommodate the height of the interlocking panels 104. The over-dig 110 may also extend outwardly from the deeper central portion of the excavation from about 18 inches to about 36 inches to accommodate the width of the interlocking panel 104 and associated concrete supports 106, and to provide sufficient room for the on-site assembly of the components of the pool wall structure 100.

The interlocking panels 104 may then be assembled by sliding the adjoining edges of each of the interlocking panels 104 along the height of the interlocking panel 104 to engage the tongue of each male edge within the groove of the female edge of the adjoining interlocking panel 104. The series of interlocking panels 104 may be arranged to form the desired pool wall configuration. If a curved pool wall section 114 is desired, the interlocking panels 104 may be bent at their male flexible portions 624 and female flexible portions 626 to form facets curved contours. The interlocking panels 104 may be engaged until the interlocking panels 104 form a closed surface around the entire perimeter of the swimming pool 10.

The upper reinforcing member 208 may be fastened to the underside of the upper panel plates 406 of each interlocking panel 104 to form a continuous structural member. A series of holes may be drilled through the upper surfaces of the upper panel plates 406 and into the upper reinforcing member 208, and a fastener 402 such as a threaded screw may be installed within each hole to secure the upper reinforcing member 208 to each upper panel plate 406. Similarly, the lower reinforcing member 210 may be fastened to the lower panel plate 408 by drilling a series of holes through the lower panel plates and into the lower reinforcing member 210 and installing a fastener 402 such as a threaded screw into each hole.

In some embodiments, a subset of the interlocking panels 104 may be assembled into a panel wall section 300 that may include from about 2 to about 30 interlocking panels 104. Each wall panel section 300 may form any wall contour including but not limited to a straight or flat wall contour or a curved contour. The panel wall sections 300 may be assembled remotely to the pool construction site and may further include an upper reinforcing member 208 and lower reinforcing member 210 fastened to the upper panel plates 406 and lower panel plates 408 respectively. In this embodiment, the upper reinforcing member 208 and lower reinforcing member 210 may extend about the total width of the wall section 300.

If pre-assembled panel wall sections 300 are used, the panel wall sections 300 may be joined in the predetermined arrangement by sliding the adjoining male edges 410 and female edges 412 together to interlock the edges in the tongue-and-groove arrangement. Adjoining ends of respective upper reinforcing members 208 and lower reinforcing members 210 may be spliced together using additional materials such as splice plates or tubular splice fittings as described herein above.

A number of reinforcing bars 404 may be inserted along the perimeter of the assembled interlocking panels 104. A hole may be drilled through the lower reinforcing member 210 and lower panel plate 408, and the reinforcing bar 404 may be inserted through the hole into the soil 202 beneath the over-dig surface 204. The reinforcing bars 404 may be inserted at any location relative to the interlocking panels 104 at any desired spacing. The reinforcing bars may also be situated such that the free ends of the reinforcing bars protrude through concrete supports 106 to provide enhanced structural integrity to the pool wall structure 100.

The free ends of the reinforcing bars 404 may extend a height from about 2 feet to about 5 feet over the top of the interlocking panels 104. Each free end of each reinforcing bar 404 may be bent at a 90 degree angle outward relative the interlocking panels 104 such that the bent ends are aligned parallel to the surrounding landscape surface 112. As such, the bent free ends of the reinforcing bars 404 may be used to form a support and/or reinforcement for a deck (not shown) surrounding the perimeter of the swimming pool 10.

The support membrane 108 may be arranged around the outer perimeter of the assembled interlocking panels 104. In addition, the support membrane 108 may extend the entire perimeter of the interlocking panels 104 and may further extend about the full height of the interlocking panels 104. In one aspect, the support membrane 108 may have a height of about 4 feet to match the height of the interlocking panels 104. In yet another aspect, the support membrane 108 may be pieced together around the outer perimeter of the interlocking panels 104 by overlapping the ends of the support membrane 108 across one of the respective keepers 600.

The support membrane 108 may be attached at the interlocked edges of adjacent interlocking panels 104 at each keeper 600. A vertical flap of the membrane 702 may be formed along the full height of the support membrane 108 and tucked into the opening of the keeper 620. One end of a retaining rod 704 may be inserted into inside of the vertical flap of the membrane 702 within of the channel 622 of the keeper 600 and slid downward along the full length of the channel 622, such that the vertical flap of the membrane 702 is pressed against the inner surface of the channel 622. The vertical flap of the membrane 702 may be similarly attached at each adjacent keeper 600 and repeated until the support membrane 108 has been secured to all keepers 600 around the outer perimeter of the interlocking panels 104. In an aspect, the support membrane 108 may be stretched taut between adjacent keepers 600 or an excess amount of support membrane 108 may be maintained between adjacent keepers 600, depending on the desired size and shape of the concrete supports 106 to be formed.

Prior to the addition of any reinforcing concrete, shims or blocks may be inserted as needed between the lower panel plates 406 and the over-dig surface 204 in order to align the upper edges of the interlocking panels 104 in a consistently level orientation. A locking ring 206 may be formed by pouring concrete into the over-dig volume between the panels 104 and the surrounding soil 202. In an aspect, the locking ring 206 may have a height from about 6 inches to about 12 inches above the over-dig surface 204, and may extend outward from the panels 104 to a distance from about 18 inches to about 36 inches, depending on the width of the over-dig 110.

The concrete supports 106 may be formed by inserting concrete into the pocket 802 formed between the interlocking panel 104 and the support membrane 108. The amount of concrete inserted into the pockets 802 may be specified in order to form a desired size and shape of the concrete supports 106.

In an aspect, the concrete supports may be formed concurrently with the locking ring 206, or the concrete supports may be formed at a separate time after the formation of the locking ring 206.

The remaining volume of the over-dig 110 that is not occupied by the locking ring 206, panels 104, or concrete supports 106 may be filled in with a filler material such as gravel, soil, or additional concrete, as described herein above.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A pool wall structure comprising:
a plurality of interlocking panels forming a continuous closed wall around the perimeter of a pool, wherein each of the plurality of interlocking panels comprises a male flexible portion and a female flexible portion situated on opposite sides of an interlocked edge between an adjacent pair of interlocking panels within the plurality of interlocking panels, wherein the male flexible portion and the female flexible portion deform along an axis parallel to the interlocked edge to form a faceted curve shape within the continuous closed wall, wherein each of the plurality of interlocking panels comprises a flat body having a thickness of material, wherein the male flexible portion comprises a first region of reduced thickness of material extending parallel to the interlocked edge, and wherein the first region of reduced thickness of material is thinner than the thickness of material of a remaining portion of the flat body, wherein the female flexible portion comprises a second region of reduced thickness extending parallel to the interlocked edge and situated on a side of the interlocked edge opposite to a corresponding male flexible portion, and wherein the second region of reduced thickness is thinner than the thickness of material of a remaining portion of the flat body.

2. The pool wall structure of claim 1, wherein the male flexible portion and the female flexible portion deform along a vertical axis.

3. The pool wall structure of claim 1, wherein at least any two adjacent pairs of interlocking panels of the plurality of interlocking panels are deformed relative to each other about the vertical axis at an angle of up to about 30 degrees.

4. The pool wall structure of claim 1, wherein each of the interlocked edges is interlocked with a tongue and groove mechanism.

5. A pool wall structure comprising:
a plurality of interlocking panels forming a continuous closed wall around the perimeter of a pool, wherein each of the plurality of interlocking panels comprises a male flexible portion and a female flexible portion situated on opposite sides of an interlocked edge between an adjacent pair of interlocking panels within the plurality of interlocking panels, wherein the male flexible portion and the female flexible portion deform along an axis parallel to the interlocked edge to form a faceted curve shape within the continuous closed wall, further comprising a concrete support contained within a support membrane attached at each of the interlocked edges.

6. A pool wall structure comprising:
a plurality of interlocked panels forming a continuous closed wall around the perimeter of a pool, wherein each of the plurality of interlocking panels comprises a concrete support contained within a support membrane attached to each of the plurality of interlocking panels along an interlocked edge between any adjacent pair of interlocking panels of the plurality of interlocking panels, wherein each of the plurality of interlocking panels further comprises a male flexible portion and a female flexible portion situated on opposite sides of each interlocked edge, wherein the male flexible portion and the female flexible portion deform along an axis parallel to the interlocked edge to form a faceted curve shape within the continuous closed wall.

7. The pool wall structure of claim 6, wherein each interlocked edge comprises a keeper defining an exposed channel extending parallel to each interlocked edge, wherein a vertical flap is formed in the support membrane that fits into the exposed channel and a retaining rod that is disposed within the vertical flap inside of the channel secures the support membrane to the keeper.

8. The pool wall structure of claim 6, wherein each of the interlocked edges is interlocked with a tongue and groove mechanism.

9. A pool wall structure comprising:
a plurality of interlocking panels forming a continuous closed wall around the perimeter of a pool, wherein each of the plurality of interlocking panels comprises a male edge and a female edge formed opposite to the male edge with the male edge of each of the plurality of panels being interlocked with a corresponding female edge of an adjacent one of the plurality of interlocking panels; wherein each of the plurality of interlocking panels further comprises a concrete support contained within a support membrane, and wherein the support membrane is attached to each of the plurality of interlocking panels along an interlocked edge comprising an interlocked male edge and female edge, wherein each of the plurality of interlocking panels further comprises a male flexible portion and a female flexible portion situated on opposite sides of each interlocked edge, wherein the male flexible portion and the female flexible portion deform along an axis parallel to the interlocked edge to form a faceted curve shape within the continuous closed wall.

10. The pool wall structure of claim 9, wherein the male edge of each of the plurality of interlocking panels is interlocked with a corresponding female edge of an adjacent one of the plurality of interlocking panels in a tongue-and-groove arrangement.

11. The pool wall structure of claim 10, wherein the male edge comprises a tongue extending parallel to the male edge and the female edge comprises a groove extending parallel to the female edge, wherein the tongue slides into the groove in a direction parallel to female edge to form the interlocked edge.

12. The pool wall structure of claim 9, wherein the concrete support contained within the support membrane is attached at each of the interlocked edges.

13. A panel for the construction of a pool wall structure comprising:
a flat body portion defining a male edge and a female edge;
a male flexible portion positioned adjacent to the male edge comprising a first deformable region extending along the height of the panel; and
a female flexible portion positioned adjacent to the female edge comprising a second deformable region extending along the height of the panel;
wherein the male edge extends along a height of the flat body portion and comprises a male side plate and a tongue, and wherein the female edge is positioned opposite to the male edge and comprises a groove and a keeper, and wherein:
the groove is shaped to receive a second tongue of a second panel in an interlocked tongue-and-groove arrangement; and
the keeper comprises a first and a second flange forming a channel shaped to receive a vertical flap of a support membrane and a retaining rod.

14. The panel of claim 13, wherein the male flexible portion comprises a region of reduced material thickness and the female flexible portion comprises a second region of reduced material thickness.

15. The panel of claim 13, wherein the female edge further comprises a female side plate extending along the height of the panel in a perpendicular direction to the panel.

16. The panel of claim 15, wherein the keeper further comprises a body attached to the female side plate along the height of the panel in the perpendicular direction to the panel.

17. The panel of claim 16, wherein the first and second flanges extend from the body in the perpendicular direction to the panel.

18. The panel of claim 16, wherein the body further comprises a free end extending into a space defined by the groove, wherein the free end fits into a corresponding slot in the tongue in an interlocked tongue-and-groove arrangement.

19. A method of constructing a pool wall structure comprising:
obtaining a plurality of interlocking panels, wherein each interlocking panel of the plurality of interlocking panels includes a male edge comprising a tongue and a female edge comprising a groove and a keeper, wherein the male edge, female edge, and keeper extend along the height of each interlocking panel of the plurality of interlocking panels;
slideably engaging the male edge of each interlocking panel with the female edge of an adjacent panel in an interlocked arrangement for the plurality of interlocking panels to form a continuous wall around a perimeter of a swimming pool;
attaching a support membrane at each keeper of the continuous wall, wherein;
the support membrane comprises a continuous sheet of material extending around the perimeter outside of the plurality of interlocking panels; and
the support membrane forms a plurality of pockets wherein each pocket of the plurality of pockets extends the height of each interlocking panel and wherein each pocket defines an upper end and a lower end, wherein the upper end and the lower end are both open;
pouring a locking ring comprising a concrete layer extending to the lower end of each panel; and
filling each of the plurality of pockets at each upper end of each panel to form a plurality of concrete supports, wherein each of the plurality of concrete supports extends the height and width of each of the plurality of interlocking panels.

20. The method of claim 19, wherein a subset of the plurality of interlocking panels are slideably engaged prior to the construction of a wall structure of the swimming pool wall to form a section of interlocking panels, and wherein multiple sections of interlocking panels are slideably engaged to one another to form the continuous wall around the perimeter of the swimming pool.

21. The method of claim 20, wherein the interlocked arrangement is an interlocked tongue and groove arrangement.

* * * * *